(12) United States Patent
Chang et al.

(10) Patent No.: US 8,271,770 B2
(45) Date of Patent: Sep. 18, 2012

(54) COMPUTER MOTHERBOARD WITH AUTOMATICALLY ADJUSTED HARDWARE PARAMETER VALUE

(75) Inventors: Chung-Hsing Chang, Yonghe (TW); Tung-Jung Tsai, Taipei (TW); Yu-Tsung Kao, Xindian (TW)

(73) Assignee: MSI Computer (Shenzhen) Co., Ltd, Shenzhen (CN)

( * ) Notice: Subject to any disclaimer, the term of this patent is extended or adjusted under 35 U.S.C. 154(b) by 498 days.

(21) Appl. No.: 12/397,950

(22) Filed: Mar. 4, 2009

(65) Prior Publication Data

US 2010/0146252 A1 Jun. 10, 2010

(30) Foreign Application Priority Data

Dec. 5, 2008 (TW) .............................. 97147280 A

(51) Int. Cl.
*G06F 1/08* (2006.01)
*G06F 1/24* (2006.01)
*G06F 15/177* (2006.01)
*G06F 1/32* (2006.01)
*G06F 9/00* (2006.01)

(52) U.S. Cl. ................ 713/1; 713/2; 713/100; 713/300; 713/310; 713/322; 713/500; 713/501; 713/502; 713/600; 713/601

(58) Field of Classification Search ................ 710/8, 10, 710/15, 25; 713/1, 2, 100, 300, 310, 320–324, 713/330, 340, 400–401, 500–503, 600–601
See application file for complete search history.

(56) References Cited

U.S. PATENT DOCUMENTS

| 6,622,254 | B1 * | 9/2003 | Kao ............................. 713/500 |
| 6,963,992 | B1 * | 11/2005 | Cheng et al. .................. 713/501 |
| 2009/0265575 | A1 * | 10/2009 | Chen ............................. 713/600 |
| 2010/0070792 | A1 * | 3/2010 | Xue et al. ...................... 713/501 |

* cited by examiner

*Primary Examiner* — Fahmida Rahman
(74) *Attorney, Agent, or Firm* — Apex Juris, pllc; Tracy M. Heims

(57) ABSTRACT

A computer motherboard with automatically adjusted hardware parameter values restarts automatically and proceeds with overclocking or power-saving operation in case the computer motherboard hangs due to preceding overclocking or power-saving operation. The computer motherboard includes: a watchdog unit connected to a frequency generator and adapted to notify the frequency generator and generate a restart signal after predetermined duration; the frequency generator for generating and outputting a frequency, and automatically decreasing or increasing, according to notice from the watchdog unit, a current frequency generated by the frequency generator so as to generate and output a new frequency to substitute for the current frequency; and a hardware parameter value setting unit for setting the frequency generator for a start frequency and an operation mode and starting the watchdog unit; wherein the computer motherboard receives the restart signal and automatically restarts at the new frequency when unbooted after predetermined duration.

20 Claims, 5 Drawing Sheets

COMPUTER MOTHERBOARD WITH AUTOMATICALLY ADJUSTED HARDWARE PARAMETER VALUE

FIELD OF THE INVENTION

The present invention relates to computer motherboards for overclocking or power-saving, and more particularly, to a computer motherboard whereby overclocking or power-saving is effectuated by automatic adjustment of hardware parameter values.

BACKGROUND OF THE INVENTION

U.S. Pat. No. 6,622,254, entitled Method of Automatically Overclocking Central Processing Unit, disclosed a method of automatically overclocking a CPU for use with a computer motherboard by using a frequency generator with functions of tuning frequency and monitoring, and applying a numeric method to get the frequency for booting a computer system, so as to automatically overclocking the CPU, wherein the computer system is powered on and enters the overclocking process, the built-in parameters storing booting settings are loaded and backed up to be referenced in the next trial of booting. U.S. Pat. No. 6,622,254 further disclosed a plurality of flags for judging current situation of the computer system and being subsequently referenced in the ensuing overclocking process. U.S. Pat. No. 6,622,254 further disclosed the following: booting frequencies are calculated by a numeric method according to the boot frequency of the first trial of booting, the highest frequency generated by frequency generators and the frequency of front side bus (FSB) of the system; and, upon completion of booting, the built-in parameters are stored to boot up the computer system at next time. Once the built-in parameters or the configuration of the computer system is changed, the values of the built-in parameters are invalid and need to be recalculated by entering the overclocking process.

However, U.S. Pat. No. 6,622,254 did not disclose that, once overclocking failure causes the computer motherboard to hang, the computer motherboard will be incapable of executing any overclocking process.

In view of the aforesaid drawback of the prior art, the inventor of the present invention realizes the need to devise a computer motherboard with automatically adjusted hardware parameter values with a view to preventing a computer motherboard from hanging due to overclocking failure.

SUMMARY OF THE INVENTION

It is an objective of the present invention to provide a computer motherboard with automatically adjusted hardware parameter values so as to effectuate overclocking or power-saving.

Another objective of the present invention is to provide a computer motherboard with automatically adjusted hardware parameter values such that, in addition to overclocking and power-saving, the computer motherboard is capable of rebooting automatically and proceeding with overclocking operation or power-saving operation in case the computer motherboard hangs due to overclocking operation or power-saving operation.

To achieve the above and other objectives, the present invention provides a computer motherboard with automatically adjusted hardware parameter values. The computer motherboard comprises: a watchdog unit connected to a frequency generator, and adapted to notify the frequency generator and generate a restart signal after a predetermined period of time; the frequency generator for generating and outputting a frequency, and for automatically decreasing or increasing, according to notice from the watchdog unit, a current frequency generated by the frequency generator so as to generate a new frequency, output the new frequency, and replace the current frequency with the new frequency; and a hardware parameter value setting unit for setting the frequency generator for a start frequency, setting the frequency generator for an operation mode, and starting the watchdog unit; wherein the computer motherboard receives the restart signal and automatically restarts at the new frequency when the computer motherboard remains unbooted after the predetermined period of time.

The present invention is herein illustrated with a preferred embodiment in conjunction with the accompanying drawings, so that one skilled in the pertinent art can easily understand other objectives, features, advantages and effects of the present invention from the disclosure of the invention.

BRIEF DESCRIPTION OF THE DRAWINGS

The aforesaid objectives, characteristics and advantages of the present invention will be more clearly understood when considered in conjunction with the detailed description of the accompanying embodiment and drawings, in which.

DETAILED DESCRIPTION OF THE INVENTION

Figure 1:
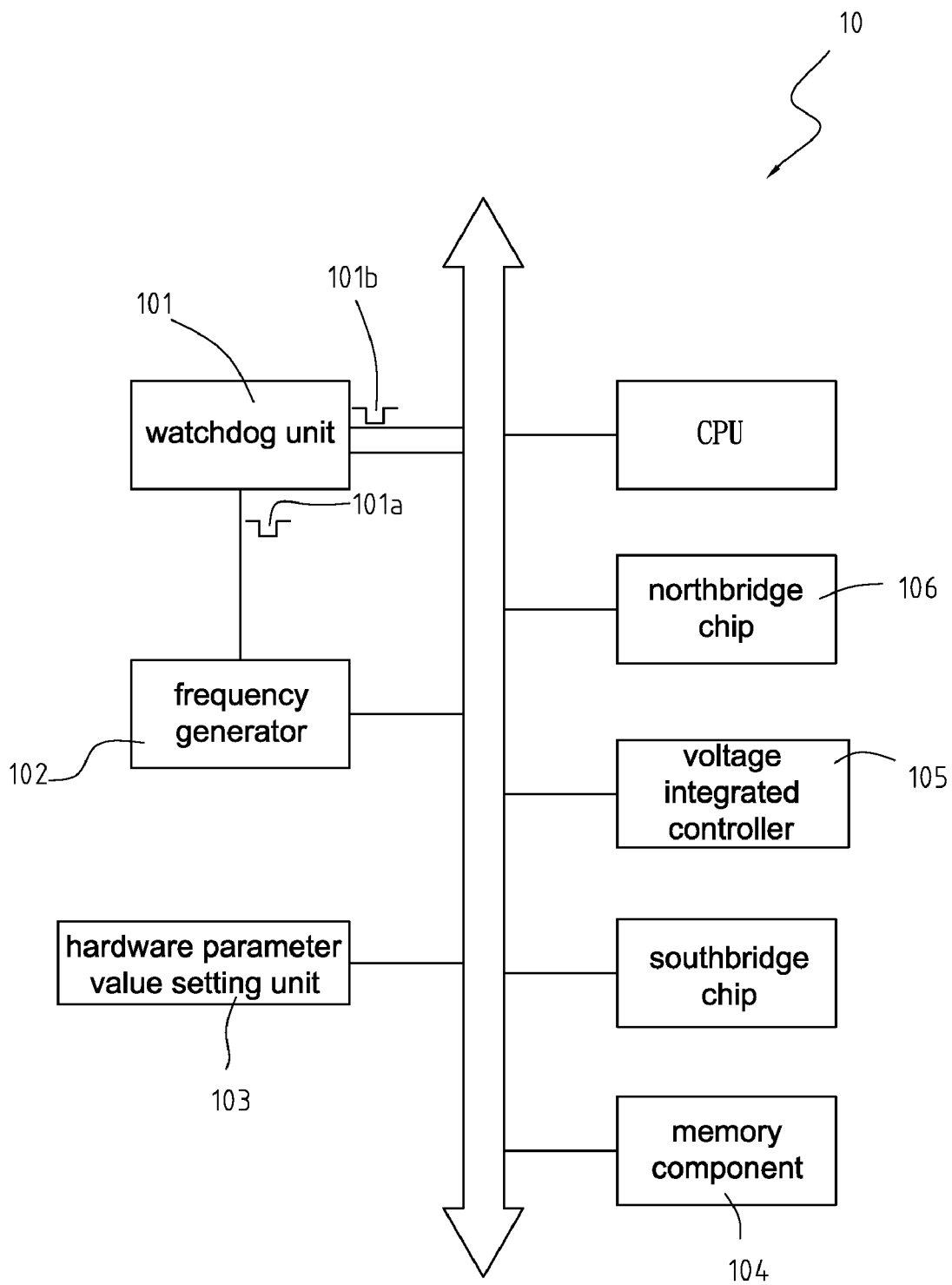
FIG. 1 is a framework diagram of a computer motherboard with automatically adjusted hardware parameter values of the present invention.

FIG. 1, a block diagram of a computer motherboard with automatically adjusted hardware parameter values of the present invention, shows relevant parts and components of a computer motherboard 10 of the present invention so that the block diagram is easy to read and understand, but omits irrelevant parts and components of the computer motherboard 10 of the present invention. Like conventional computer motherboards, the specifications of built-in parts and components of the computer motherboard 10 can be obtained by the computer motherboard 10; for example, the computer motherboard 10 knows the types of the CPU, DDR memory, DDR2 memory, etc, of the computer motherboard 10. Also, like conventional computer motherboards, the computer motherboard 10 of the present invention automatically configures the built-in parts and components, using default parameter values by reference to the specifications of the built-in parts and components. To effectuate overclocking or power-saving, the computer motherboard 10 of the present invention changes the frequency of front side bus (FSB) of the system automatically in response to each of one or more trials of booting or shutdown, so as to find and identify the hardware parameter values suitable for overclocking operation or power-saving operation performed in accordance with current hardware requirements of the computer motherboard 10.

The computer motherboard 10 of the present invention at least comprises a watchdog unit 101, a frequency generator 102, a hardware parameter value setting unit 103, and a memory component 104, as described below.

The watchdog unit 101 is connected to the frequency generator 102. A function of the watchdog unit 101 is to automatically generate and send a signal 101a to the frequency generator 102 after a predetermined period of time, so as to notify the frequency generator 102. Another function of the watchdog unit 101 is to generate a restart signal 101b automatically after the predetermined period of time, so as to enable the computer motherboard 10 to automatically shut down and then restart. After the watchdog unit 101 has generated the signals 101a and 101b, the watchdog unit 101 automatically starts timing (or counting). In a preferred embodiment, the watchdog unit 101 can adopt related arts of conventional counters or conventional timers. The length of the predetermined period of time is, for example, the duration from the moment when the computer is powered on to the moment when an operating system (such as Microsoft® Windows operating system) is loaded to the full.

The frequency generator 102 has a function, namely generating a frequency such that multiples of the frequency, that is, N times the frequency, where N>0, such as frequency×3, frequency×3.5, frequency×4, frequency×5, etc., become an internal frequency to the CPU. Each of the internal frequencies is an operating frequency for the CPU. For example, by the expression "3 GHz CPU", it means that the CPU operates at an internal frequency of 3 GHz. The hardware parameter value setting unit 103 sets the frequency generated by the frequency generator 102; for example, the hardware parameter value setting unit 103 sets the frequency generator 102 for 333 Mhz. Furthermore, the hardware parameter value setting unit 103 sets the operation of the frequency generator 102 to a decreasing frequency mode or an increasing frequency mode. The hardware parameter value setting unit 103 sets the frequency generator 102 for a decreasing frequency $\Delta F1$ and an increasing frequency $\Delta F2$. Another function of the frequency generator 102 is to receive the signal 101a from the watchdog unit 101, and automatically decrease or increase, according to whether the current operation mode is the decreasing frequency mode or the increasing frequency mode, a current frequency generated by the frequency generator 102, so as to generate a new frequency and then output the new frequency. For example, where a frequency of 333 Mhz is generated before the signal 101a is received, a new frequency below 333 Mhz, such as 300 Mhz, will be obtained by subtracting $\Delta F1$ (for example, $\Delta F1=33$ Mhz) from 333 Mhz after the signal 101a has been received, provided that the frequency generator 102 is operating at the decreasing frequency mode. In another scenario, given a frequency of 333 Mhz generated before the signal 101a is received, a new frequency above 333 Mhz, such as 366 Mhz, will be obtained by adding $\Delta F2$ (for example, $\Delta F2=33$ Mhz) to 333 Mhz after the signal 101a has been received, provided that the frequency generator 102 is operating at the increasing frequency mode. Once the new frequency is generated, the new frequency (such as 300 Mhz or 366 Mhz) will be outputted.

Alternatively, the restart signal 101b is generated by the frequency generator 102 automatically.

In a preferred embodiment, the frequency generator 102 can adopt related arts of conventional frequency generators.

Also, the watchdog unit 101 and the frequency generator 102 can be integrated into a single integrated circuit (IC).

The memory component 104 has a function, namely, storing a plurality of hardware parameter values. The hardware parameter values are stored prior to deliver of the computer motherboard 10. Each of the combinations of parts/components operating in conjunction with the computer motherboard 10, such as a combination of CPU and memory, is subject to an upper limit of hardware parameter values for use in overclocking and overvoltage, and a lower limit of hardware parameter values for use in underclocking and undervoltage. The upper limit of hardware parameter values and the lower limit of hardware parameter values for the combinations of parts/components operating in conjunction with the computer motherboard 10 are stored in the memory component 104. Another function of the memory component 104 is to record and store the hardware parameter values attributed to instances of successful boot of the computer motherboard 10. In a preferred embodiment, the memory component 104 is flash memory.

The computer motherboard 10 boots in the first instance, using default hardware parameter values.

Figure 2A:
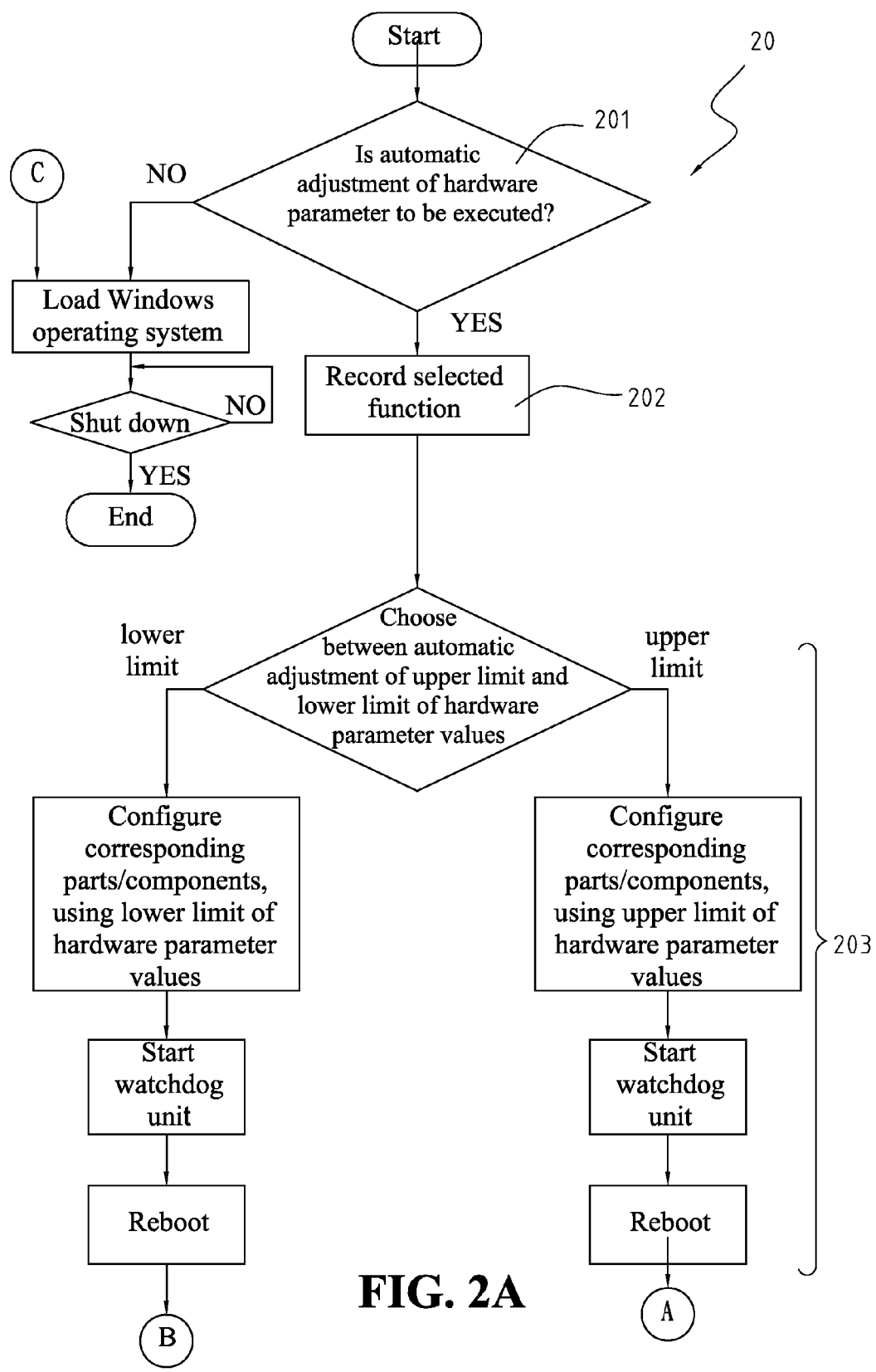
FIGS. 2A through 2C are flow charts of operation of the computer motherboard of the present invention.
Figure 2B:
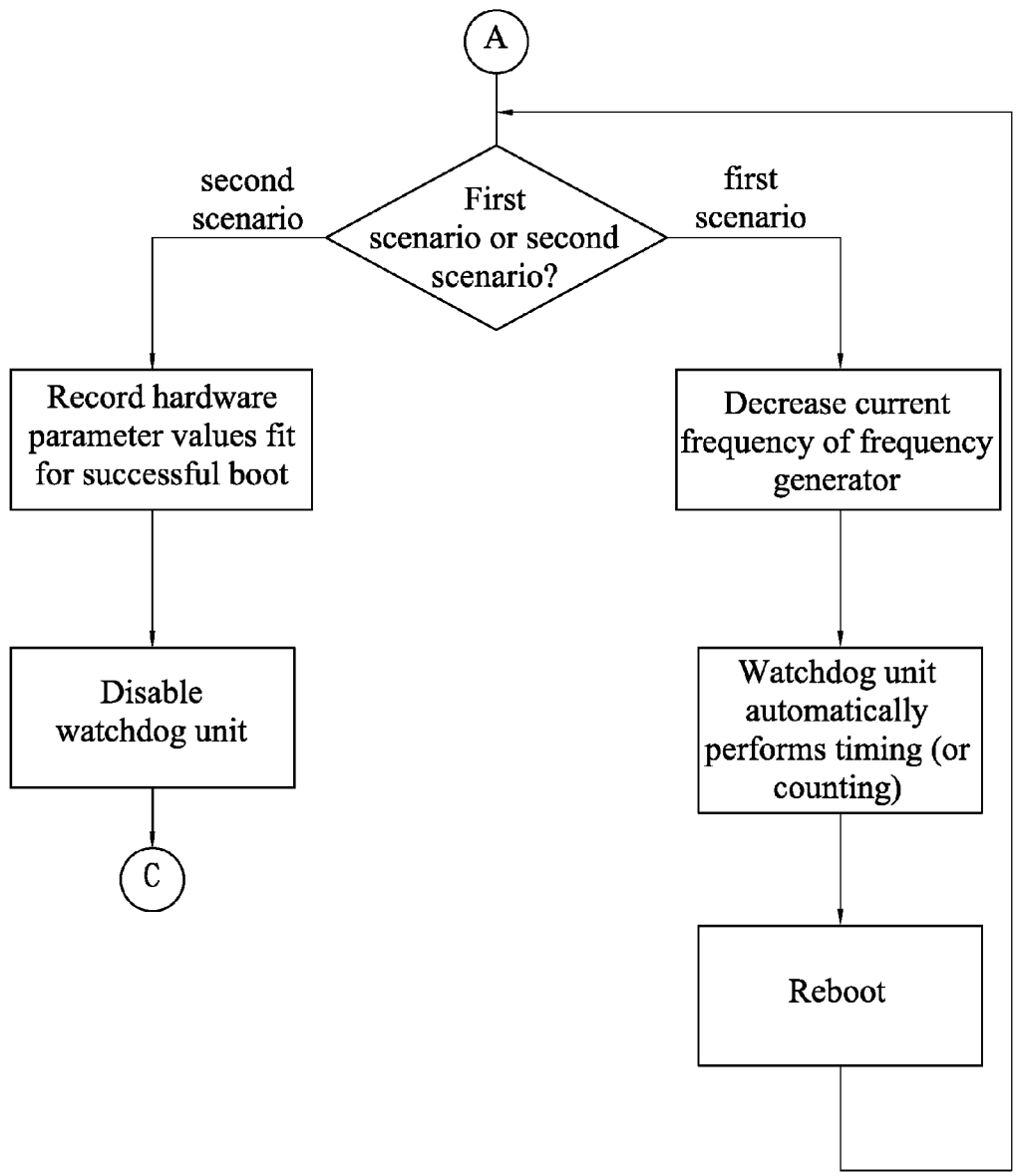
Figure 2C:
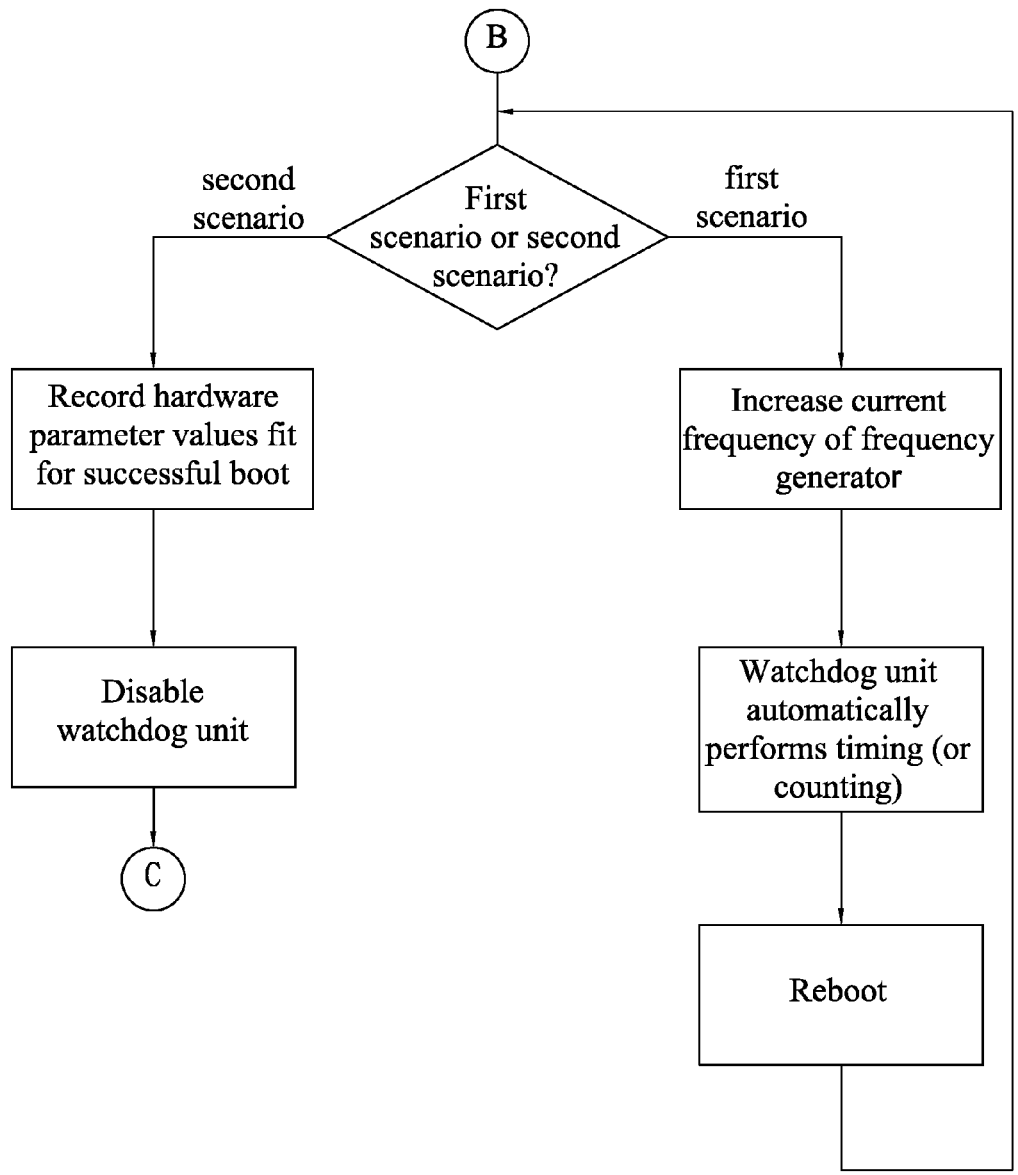

FIGS. 2A through 2C are flow charts of operation flow 20 of the computer motherboard 10 of the present invention. Step 201 involves determining whether a user is to automatically adjust hardware parameter values. There are three ways to perform step 201. In a preferred embodiment, the hardware parameter value setting unit 103 is an application program or the Basic Input/Output System (BIOS) of the computer motherboard 10. To instruct the computer motherboard 10 to execute automatic adjustment of hardware parameter values, take one of the following three approaches. The three approaches to automatic adjustment of hardware parameter values are exemplified by BIOS 103. The first approach comprises the following steps: selecting and enabling, by a user, "automatic adjustment of hardware parameter values" on the configuration screen of the BIOS 103, and choosing between "automatic adjustment of hardware parameter values for use in overclocking and overvoltage" and "automatic adjustment of hardware parameter values for use in underclocking and undervoltage". The second approach comprises the following steps: the button of "automatic adjustment of hardware parameter values for use in overclocking and overvoltage" function and the button of "automatic adjustment of hardware parameter values for use in underclocking and undervoltage" function in the panel on the computer casing are configured, and then the BIOS 103 determines which function to execute according to a press signal of the two buttons. The third approach involves executing, with the Windows operating system, the application program 103 for starting automatic adjustment of hardware parameter values.

Referring to step 202, after the user has selected the "automatic adjustment of hardware parameter values" function, the BIOS 103 records the selected function. Data specific to and required for the selected function are written to the memory component 104 by the BIOS 103.

Referring to step 203, upon the user's selection of execution of "automatic adjustment of hardware parameter values for use in overclocking and overvoltage" function, the BIOS 103 reads from the memory component 104 the upper limit of hardware parameter values for one of the combinations of parts/components which conform to current hardware requirements for the computer motherboard 10, and then the BIOS 103 sets the corresponding parts/components to the upper limit of hardware parameter values (referring to FIGS. 2A and 2B). The BIOS 103 configures the frequency generator 102 so as to specify the frequency to be generated by the frequency generator 102 and then used as start frequency by the frequency generator 102. The BIOS 103 configures the frequency generator 102 so as to specify a decreasing frequency mode and an decreasing frequency $\Delta F1$. The BIOS 103 optionally configures a voltage integrated controller 105 so as to specify a voltage for CPU. The BIOS 103 optionally configures a memory controller of a northbridge chip 106 so as to specify a memory clock. The BIOS 103 starts the watchdog unit 101. On the other hand, upon the user's selection of execution of "automatic adjustment of hardware parameter values for use in underclocking and undervoltage" function, the BIOS 103 reads from the memory component 104 the lower limit of hardware parameter values for one of the combinations of parts/components which conform to current hardware requirements for the computer motherboard 10, and then the BIOS 103 sets the corresponding parts/components to the lower limit of hardware parameter values (referring to FIGS. 2A and 2C). The frequency generator 102 is configured differently in the two aforesaid scenarios, hence, the frequency generator 102 is described in detail. The BIOS 103 configures the frequency generator 102 so as to specify the frequency to be generated by the frequency generator 102 and then used as start frequency by the frequency generator 102, and configures the frequency generator 102 so as to specify a increasing frequency mode and an increasing frequency $\Delta F2$.

Afterward, the BIOS 103 starts the watchdog unit 101 and restarts the computer motherboard 10.

There are two scenarios where the computer motherboard 10 restarts. In the first scenario, the computer motherboard 10 using the hardware parameter values fails to boot and therefore hangs. In the second scenario, the computer motherboard 10 boots successfully, using the hardware parameter values. In the event of the first scenario, after a predetermined period of time from the moment when the computer motherboard 10 hangs, the watchdog unit 101 generates the signals 101$a$, 101$b$, and then the frequency generator 102 receives the signal 101$a$ and automatically decrease by $\Delta F1$ or increase by $\Delta F2$, according to whether the current operation mode is the decreasing frequency mode or the increasing frequency mode, a current frequency generated by the frequency generator 102, so as to generate a new frequency to substitute for the current frequency. Upon receipt of the signal 101$b$, the computer motherboard 10 automatically restarts at the new frequency. The watchdog unit 101 automatically performs timing (or counting) anew.

The two scenarios also apply when the computer motherboard 10 restarts at the new frequency. In the first scenario, with the frequency generator 102, the current frequency is decreased by $\Delta F1$ or increased by $\Delta F2$ to generate a new frequency that substitutes for the current frequency, and then the computer motherboard 10 is configured again so as to restart at the new frequency repeatedly until the computer motherboard 10 comes by the second scenario.

As described above, in the second scenario, the computer motherboard 10 boots successfully; meanwhile, the computer motherboard 10 has to disable the timing (or counting) function of the watchdog unit 101 and prohibit the watchdog unit 101 from generating the signals 101$a$, 101$b$. Also, the new frequency fit for successful boot is stored in the memory component 104 by the computer motherboard 10.

In a preferred embodiment, codes for use in the second scenario is a driver, or is a portion of codes of the BIOS 103. After the computer motherboard 10 has booted successfully and loaded the Windows operating system, the driver or the portion of the codes of the BIOS 103 is called and executed by using the call of the Windows operating system.

Furthermore, the computer motherboard 10 can use the new frequency fit for successful boot as the start frequency of the frequency generator 102, so as to restart the watchdog unit 101 and therefore perform step 203 once more. In so doing, it is likely to obtain another new frequency fit for successful boot. With repetition, it is likely to obtain a plurality of new frequencies fit for successful boot.

The operation flow 20 executed by the computer motherboard 10 is further subject to variation of voltage for CPU and variation of voltage for a main memory (for example, DDR, DDR2). For example, configuration of the memory controller of the computer motherboard 10, configuration of the voltage integrated controller of the computer motherboard 10 for voltage for CPU, and variation in the combination of the above-mentioned configuration together enable a test to be carried out to the operation flow 20 of the computer motherboard 10, and in consequence the computer motherboard 10 automatically acquires the combinations of the hardware parameter values for use in overclocking operation and overvoltage operation to ensure the computer motherboard 10 successful boot. By the same token, the computer motherboard 10 automatically acquires the combinations of the hardware parameter values for use in underclocking operation and undervoltage operation to ensure the computer motherboard 10 successful boot.

The computer motherboard 10 readily chooses, from a plurality of combinations of hardware parameter values fit for successfully boot, the optimal power-saving combination that ensures the computer motherboard 10 successful boot or the maximum-limit combination applicable to overclocking operation and overvoltage operation and fit for successful boot.

Figure 3:
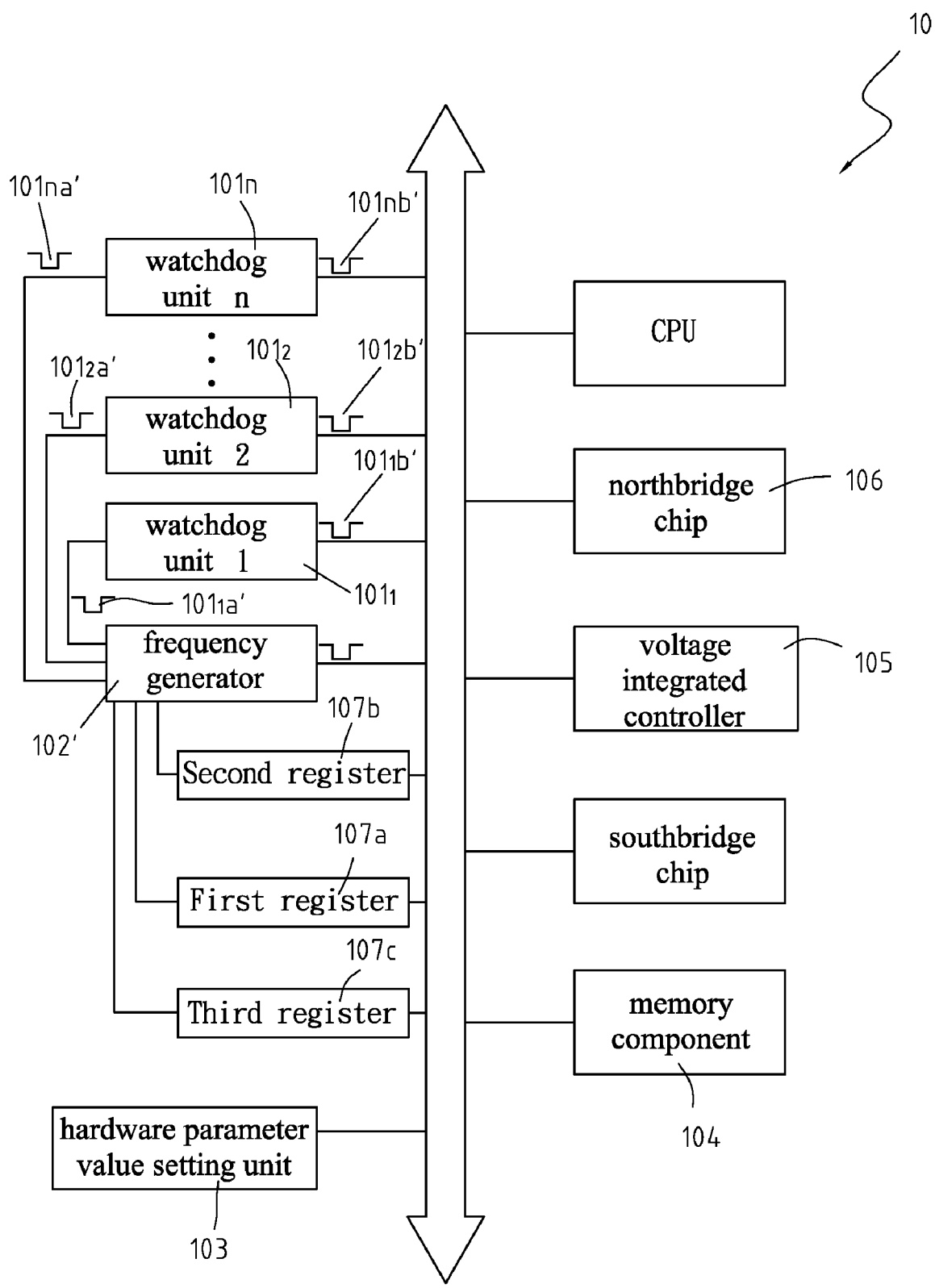
FIG. 3 is a framework diagram of another embodiment of the computer motherboard with automatically adjusted hardware parameter values of the present invention.

FIG. 3 is a framework diagram of another embodiment of the computer motherboard with automatically adjusted hardware parameter values of the present invention. At least two watchdog units $101_1$~$101_n$ are connected to the frequency generator 102'. The watchdog units $101_1$~$101_n$ are set for different watchdog start times, respectively, so as to monitor different said computer motherboards 10 at different boot stages. When the watchdog start times come, respective the watchdog units $101_1$~$101_n$ generate signals $101_1 a'$~$101_n a'$ and signals $101_1 b'$~$101_n b'$. The signals $101_1 b'$~$101_n b'$ comprise reboot signals.

The computer motherboard 10 further comprises a first register 107$a$, a second register 107$b$, and a third register 107$c$. An initial value of frequency of the automatically adjusted hardware parameter values of the present invention is stored in the first register 107$a$. The initial value of frequency of the frequency generator 102 is retrievable from the first register 107$a$. The decreasing frequency or the increasing frequency of the automatically adjusted hardware parameter values of the present invention is stored in the second register 107$b$. The frequency generator 102' generates a new frequency by decreasing or increasing a current frequency by reference to a frequency value stored in the second register 107$b$ and according to the current operation mode (the decreasing frequency mode or the increasing frequency mode).

A flag is stored in the third register 107$c$. The purpose of the flag is to indicate that the computer motherboard 10 has executed the automatically adjusted hardware parameter values of the present invention. Configuration of register values of the first register 107$a$, the second register 107$b$, and the third register 107$c$ is effectuated by the hardware parameter value setting unit 103.

Persons skilled in the art are able to further develop an application program for use with the computer motherboard 10 of the present invention, so as to display on the screen the plurality of combinations of the hardware parameter values whereby the computer boots successfully, and categorize the plurality of combinations of the hardware parameter values, for example, dividing the plurality of combinations of the hardware parameter values into power-saving combinations of the hardware parameter values, overclocking combinations of the hardware parameter values, safe power-saving combinations of the hardware parameter values, and safe overclocking combinations of the hardware parameter values. In the preferred embodiment of the present invention, a user selects a combination under one of the categories, and then the application program configures related built-in parts and components of the computer motherboard 10, using hardware parameter values attributed to the selected combination of hardware parameter values, thereby enhancing the functionality of a computer motherboard.

A computer motherboard of the present invention is provided with automatically adjusted hardware parameter values such that, in addition to overclocking and power-saving, the computer motherboard is capable of rebooting automatically, changing the rebooting frequency automatically, and proceeding with overclocking operation or power-saving operation in case the computer motherboard hangs due to overclocking operation or power-saving operation. The aforesaid technical features embody the advantages and most important characteristic of the present invention.

The preferred embodiment is only illustrative of the features and functions of the present invention but is not intended to restrict the scope of the present invention. It is apparent to those skilled in the art that all equivalent modifications and changes made in the preferred embodiment of the present invention should fall within the scope of the present invention without departing from the disclosure therein.

What is claimed is:

1. A computer motherboard with automatically adjusted hardware parameter values, the computer motherboard comprising:
    a watchdog unit connected to a frequency generator where the watchdog unit is adapted to notify the frequency generator after a predetermined period of time to generate a restart signal that is sent to the computer motherboard and then to automatically start timing or counting after the frequency generator is notified and the restart signal is generated by the frequency generator;
    the frequency generator for generating and outputting a frequency, and automatically decreasing or increasing, according to notice from the watchdog unit, a current frequency generated by the frequency generator so as to generate a new frequency, output the new frequency, and replace the current frequency with the new frequency; and
    a hardware parameter value setting unit for setting the frequency generator for a start frequency, setting the frequency generator for an operation mode, and starting the watchdog unit;
    wherein the computer motherboard receives the restart signal and automatically restarts at the new frequency when the computer motherboard remains unbooted after the predetermined period of time, wherein the frequency generator is configured to increase the frequency when the operation mode is set for overclocking operation of the motherboard and to decrease the frequency when the operation mode is set for power saving operation of the motherboard.

2. The computer motherboard of claim 1, wherein an internal frequency of a CPU is N times the new frequency, where N>0.

3. The computer motherboard of claim 1, wherein the watchdog unit and the frequency generator are integrated into a single integrated circuit.

4. The computer motherboard of claim 1, wherein the hardware parameter value setting unit further sets a voltage integrated controller of the computer motherboard for a voltage for CPU.

5. The computer motherboard of claim 1, wherein the hardware parameter value setting unit further sets a memory controller of the computer motherboard for a memory clock.

6. The computer motherboard of claim 1, wherein the hardware parameter value setting unit is further adapted to disable the watchdog unit when the computer motherboard boots normally.

7. The computer motherboard of claim 1, wherein the hardware parameter value setting unit is a basic input/output system (BIOS) or an application program.

8. The computer motherboard of claim 1, further comprising codes for prohibiting the watchdog unit from generating the restart signal and prohibiting the watchdog unit from notifying the frequency generator when the computer motherboard boots normally.

9. The computer motherboard of claim 8, wherein the codes are a driver.

10. The computer motherboard of claim 1, wherein the amount of the watchdog unit is one or at least two.

11. The computer motherboard of claim 1, further comprising a first register, a second register, and a third register.

12. A computer motherboard with automatically adjusted hardware parameter values, the computer motherboard comprising:
    a watchdog unit connected to a frequency generator where the watchdog unit is adapted to notify the frequency generator after a predetermined period of time and automatically starts timing or counting after the frequency generator is notified and a restart signal is generated where the restart signal is for restarting the computer motherboard where said motherboard further comprises a hardware parameter value setting unit for setting the frequency generator for a start frequency, setting the frequency generator for an operation mode, and starting the watchdog unit; and
    the frequency generator for receiving configuration of the start frequency, generating and outputting the start frequency, and automatically decreasing or increasing, according to each of a plurality of instances of notice from the watchdog unit, the start frequency, respectively, so as to generate a new frequency and output the new frequency;
    wherein the computer motherboard receives the restart signal and automatically restarts at the new frequency when the computer motherboard remains unbooted after the predetermined period of time, wherein the frequency generator is configured to increase the frequency when the operation mode is set for overclocking operation of the motherboard and to decrease the frequency when the operation mode is set for power saving operation of the motherboard.

13. The computer motherboard of claim 12, wherein an internal frequency of a CPU is N times the new frequency, where N>0.

14. The computer motherboard of claim 12, wherein the watchdog unit and the frequency generator are integrated into a single integrated circuit.

15. The computer motherboard of claim 12, wherein the hardware parameter value setting unit further sets a voltage integrated controller of the computer motherboard for a voltage for CPU.

16. The computer motherboard of claim 12, wherein the hardware parameter value setting unit further sets a memory controller of the computer motherboard for a memory clock.

17. The computer motherboard of claim 12, wherein the hardware parameter value setting unit is further adapted to disable the watchdog unit when the computer motherboard boots normally.

18. The computer motherboard of claim 12, wherein the hardware parameter value setting unit is a basic input/output system (BIOS) or an application program.

19. The computer motherboard of claim 12, wherein the amount of the watchdog unit is one or at least two.

20. The computer motherboard of claim 12, further comprising a first register, a second register, and a third register.

* * * * *